2,941,984
Patented June 21, 1960

2,941,984

POLYMERS FROM DIHYDRAZIDES

Hobson D. De Witt, New Wilmington, Pa., assignor to The Chemstrand Corporation, Decatur, Ala., a corporation of Delaware No Drawing. Filed Sept. 10, 1958, Ser. No. 760,099

5 Claims. (Cl. 260—77.5)

This invention relates to the preparation of polymeric materials and more particularly to the preparation of polymers obtained from dihydrazides of dicarboxylic acids and bis-chloroformates and having fiber-forming properties.

It is well-known to produce fiber-forming polymeric polyurethanes by the reaction of a diamine and a bis-chloroformate, the polyurethanes being characterized by the recurring unit of NHCOO. With respect to the utilization of polyurethanes to any extent in the textile field only the polyurethane produced from 1,4-butanediol bis-chlorocarbonic acid ester and hexamethylenediamine is worthy of note.

It is an object of this invention to provide a new polyurethane suitable for use in the production of new and useful flexible films, filamentary products and other shaped objects that have improved properties. It is another object of this invention to provide a process for the production of a new and useful polymer from dihydrazides of dicarboxylic acids and bis-chloroformates. It is still another object of this invention to provide a new composition of matter, the reaction product of which finds utility in textile applications. Other objects and advantages will become apparent from the following detailed description.

The objects of this invention are accomplished by bringing together a dihydrazide of a dicarboxylic acid and a bis-chloroformate of a dihydric alcohol under polycondensation conditions in the presence of an acid acceptor and maintaining the reaction until a fusible useful highly polymeric product is formed. The polycondensation reaction is rapid, easily controlled and requires no special equipment. The resulting polymer is a long chain synthetic material that has recurring urethane groups attached directly to amide groups as an integral part of the polymer chain and is capable of being formed into filaments in which the structural elements thereof are oriented in the direction of the filament axis. The resulting polymer is composed of regularly recurring structural units of the general formula

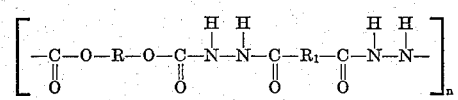

where $n$ is a whole number indicative of the molecular weight of the polymer and R is the residue of the dihydric alcohol used and $R_1$ is the residue of the dicarboxylic acid used. More particularly, R and $R_1$ are divalent organic radicals, preferably saturated aliphatic radicals containing from 2–10 carbon atoms in the chain, and are substantially free from reactive substituents.

The dihydrazides of dicarboxylic acids used in the practice of this invention have the carboxyl groups attached to aliphatic carbons and are prepared in a manner known in the technical literature. Specific examples that may be mentioned include succinic dihydrazide, glutaric dihydrazide, adipic dihydrazide, pimelic dihydrazide, suberic dihydrazide, azelaic dihydrazide and sebacic dihydrazide. It is to be understood that the invention is not, however, confined to the use of dihydrazides of dicarboxylic acids in which the carboxyl groups are linked by unsubstituted polymethylene chains. These groups may be linked as well by polymethylene chains containing substituents which are not reactive with the reactants used. Examples of dihydrazides of dicarboxylic acids containing such chains are 1,3-dimethylglutaric dihydrazide, 2-methyl-adipic dihydrazide, 1,1- and 2,2-dimethyladipic dihydrazide and 3-methoxy-adipic dihydrazide.

The bis-chloroformates of dihydric alcohols may be prepared by reacting one mol of a selected dihydroxy compound with 2 mols of phosgene, i.e., carbonyl chloride. The bis-chloroformates of diols having the hydroxyl groups attached to a saturated aliphatic radical containing 2–10 carbon atoms are preferred and may be prepared by reacting phosgene with ethylene glycol, trimethylene glycol, 1,4-butanediol, 1,5-pentanediol, 1,6-hexanediol, for example. Higher glycols wherein the alkylene chain contains a greater number of carbon atoms or branched chains, as well as glycols having substituents inert in the reaction, are also satisfactory.

It is generally more advantageous to react the dihydrazide of dicarboxylic acid and the bis-chloroformate of a dihydric alcohol in substantially equimolecular quantities. While the molecular ratio of the reactants has no pronounced effect on the polymer obtained, a marked molecular excess of one reactant over the other creates a recovery problem due to the presence of the unreacted intermediate and is not economical.

The polymers embodying the invention are prepared by bringing the dihydrazide and bis-chloroformate as defined above into intimate contact at reaction temperatures, preferably until the resulting polymer has attained a sufficiently high molecular weight to form filaments when a thread is withdrawn from the melt. While the present invention also contemplates the production of lower molecular weight polymers which may be useful as lacquers, coating compositions, and the like, it is usually desirable to continue the polycondensation reaction until a polymer having a molecular weight of at least 10,000 and desirably at least 25,000 is attained, the molecular weight being determined by measuring the viscosity of dilute solutions in a manner well-known in the art. The polycondensation reaction can be effected at atmospheric pressure or at an elevated pressure. The method of preparing the polymers may include mass polymerization, solution polymerization, or aqueous suspension polymerization which are conducted in the conventional manner. The polycondensation may be conducted in batch lots, by continuous methods, or by semi-continuous methods.

During the polycondensation reaction hydrochloric acid is liberated and reacts with an acid acceptor that is present in the reaction medium with the dihydrazide and bis-chloroformate. Preferably, the acceptor which is an alkaline agent, for example, sodium hydroxide, sodium carbonate, barium hydroxide, trisodiumphosphate, organic amines and the like, is used in slight stoichiometric excess of that required exactly to neutralize all of the hydrochloric acid formed.

In producing the polymer of the present invention the polycondensation may be conducted in the presence of a catalyst as well as in the presence of molecular weight regulators. Other additives that modify the polymer such as delusterants, plasticizers, pigments, colorants, oxidation inhibitors, and the like may also be incorporated in the polymer if desired. Filaments may be produced from the melt by wet spinning, i.e., by extruding a melt of the polymer through suitable orifices in a spinneret and into a cooling atmosphere. Filaments may also be produced by conventional wet spinning where a solution of the polymer is extruded through suitable orifices in a spinneret and into a non-solvent bath or by dry spinning where a solution of the polymer is extruded through suitable orifices in a spinneret and into a chamber containing an evaporative atmosphere. If the polymer is of sufficiently high molecular weight, the filaments so formed may be drawn at comparatively low temperatures to filaments having good tenacity and elasticity.

In order to more clearly understand the process of the present invention, the following example is given which is intended to be illustrative and not limitative.

Example

In a glass flask of suitable size containing 20 ml. of water, there was dissolved 1.74 grams of adipic dihydrazide. While vigorously stirring the resulting solution, there were added 2.15 grams of tetramethylene bis-chloroformate and 0.84 gram of sodium hydroxide in 10 ml. of water. A finely divided white precipitate formed in the solution and slowly settled. After 3 hours of stirring the reaction mixture, the precipitate was filtered, washed, and dried. The precipitated polymeric material had a melting point of 150–160° C. and fibers could be pulled from its melt. It was found that the material was readily soluble in metacresol.

When the above example is repeated with other defined dihydrazides of dicarboxylic acids and bis-chloroformates of dihydric alcohols, similar results are obtained. For example, when pentamethylene bis-chloroformate, hexamethylene bis-chloroformate, and the like are employed, polymers capable of being formed into fibers having useful textile properties are obtained. Likewise, useful polymers are obtained when succinic dihydrazide, glutaric dihydrazide, and other dihydrazides of the type are employed.

It is not intended that the invention be limited solely to the details of the embodiments set forth above as it will be recognized by the man skilled in the art that numerous and obvious modifications conforming to the spirit of the invention may be made, and it is intended that the invention be limited solely by the scope of the appended claims.

What is claimed is:

1. long chain synthetic polymer having a molecular weight of at least 10,000 and composed of recurring structural units of the general formula

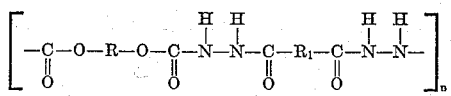

where $n$ is a whole number indicative of the molecular weight and R and $R_1$ are saturated aliphatic radicals containing from 2–10 carbon atoms and being substantially free from reactive substituents and which is capable of being formed into filaments in which the structural elements thereof are oriented in the direction of the filament axis.

2. A method of producing a long chain synthetic polymer comprising reacting together in about equal molar amounts a dihydrazide of a dicarboxylic acid having the carboxyl groups attached to a saturated aliphatic radical containing 2–10 carbon atoms and a bis-chloroformate of a dihydric alcohol having the hydroxyl groups attached to a saturated aliphatic radical containing 2–10 carbon atoms until a fusible highly polymeric product is formed.

3. A method of producing a long chain synthetic polymer comprising reacting together in the presence of a HCl acceptor and in about equal molar amounts a dihydrazide of a dicarboxylic acid having the carboxyl groups attached to a saturated aliphatic radical containing 2–10 carbon atoms and a bis-chloroformate of a dihydric alcohol having the hydroxyl groups attached to a saturated aliphatic radical containing 2–10 carbon atoms until a fusible highly polymeric product is formed.

4. A method of producing a long chain synthetic polymer comprising reacting together in about equal molar amounts adipic dihydrazide and tetramethylene bis-chloroformate until a fusible highly polymeric product is formed.

5. A method of producing a long chain synthetic polymer comprising reacting together in the presence of a HCl acceptor and in about equal molar amounts adipic dihydrazide and tetramethylene bis-chloroformate until a fusible highly polymeric product is formed.

References Cited in the file of this patent

UNITED STATES PATENTS

| | | |
|---|---|---|
| 2,395,642 | Prichard | Feb. 26, 1946 |
| 2,512,632 | Fisher et al. | June 27, 1950 |
| 2,615,862 | McFarlane et al. | Oct. 28, 1952 |

FOREIGN PATENTS

| | | |
|---|---|---|
| 883,650 | Germany | July 20, 1953 |